United States Patent [19]

Hengerer et al.

[11] Patent Number: 5,672,217
[45] Date of Patent: Sep. 30, 1997

[54] METHOD FOR PRODUCING MACHINE ELEMENTS OF STEEL

[75] Inventors: Frank Hengerer, Schwebheim, Austria; Johann Volkmuth, Nieder lauer, Germany

[73] Assignee: SKF GmbH, Schweinfurt, Germany

[21] Appl. No.: 865,674

[22] Filed: Apr. 8, 1992

Related U.S. Application Data

[63] Continuation of Ser. No. 667,028, Mar. 8, 1991, abandoned.

[30] Foreign Application Priority Data

Mar. 9, 1990 [DE] Germany ............... 40 07 487.0

[51] Int. Cl.$^6$ ..................... C21D 9/40
[52] U.S. Cl. ............ 148/589; 148/566; 148/567; 148/570; 148/663
[58] Field of Search ............ 148/589, 545, 148/566, 570, 572, 663

[56] References Cited

U.S. PATENT DOCUMENTS 3,477,884 11/1969 Schlicht ................ 148/663
3,575,737 4/1971 Carlen et al. ............ 148/12.4
4,407,683 10/1983 Higikata et al. ........... 148/150

OTHER PUBLICATIONS

Deutsche Normen, Wälzlagerstähle, Technische Lieferbedingungen, Deutsches Institut für Normung, Din 17 230, Sep. 1980, pp. 1–17.

Metals Handbook, Heat Treating, 9th Edition, vol. 4 pp. 12, 71, 75–76, (1981).

Lubrication, vol. 37, No. 9, Sep. 1951 p. 104.

Primary Examiner—Sikyin Ip
Attorney, Agent, or Firm—Baker & McKenzie

[57] ABSTRACT

In a method for producing machine elements of steel having a carbon content of 0.3 to 1.1%, blanks are heated to austenitizing temperature and austenitized, quenched for the formation of martensite, heated from room temperature to a maximum tempering temperature, and immediately after reaching said maximum temperature cooled to room temperature to attain a hardness of 45 to 65 RHC and finish-machined to machine elements.

8 Claims, 2 Drawing Sheets

METHOD FOR PRODUCING MACHINE ELEMENTS OF STEEL

This application is a continuation of application Ser. No. 07/667,028, filed Mar.8, 1991, now abandoned.

BRIEF DESCRIPTION OF THE INVENTION

The present invention relates to a method for producing elements made from steel having hardness of 45 to 65 RHC suitable for use in machines.

DESCRIPTION OF THE PRIOR ART

According to a known method found in the prior art, a blank is austenitized, quenched and tempered at a temperature of about 230° C. with a holding time of at least two hours, so that after cooling, the blank acquires a stabilized structure with a hardness of over 60 RHC (See U.S. Pat. No. 3,131,097). Because of the long holding time in tempering, this known method is a costly one. Particularly significant is the fact that this known method cannot be integrated easily into a production line, because the holding time does not permit steady feed of the blanks to the finish-machining machinery.

The object of the present invention is to provide a method for producing machine elements made of steel having a hardness of 45 to 65 RHC wherein the tempering heat treatment of the blanks can be carried out continuously and in a relatively short feed-through time of a linked line-to-line production.

SUMMARY OF THE INVENTION

The present invention relates to a method for producing machine elements made from steel, starting from blanks having, at least in their surface layer, a carbon content of from about 0.3 to about 1.1% preferably about 0.8 to 1.1%. In accordance with the method of the present invention, the blanks described above are heated to an austenitizing temperature and austenitized, quenched for the formation of martensite, heated from room temperature to a tempering temperature, and then cooled to room temperature to reach a hardness of between about 45 and about 65 RHC, preferably between about 55 and 65 RHC, and machine-finished to machine elements.

In order to be able to carry out the tempering treatment in a continuous line-to-line operation and within a relatively short time using a linkage system process, the blanks in question are steadily heated, with a relative heating time of $t/d=50$ to 210, (where t is heating time in seconds, and d is thickness of the blank in mm), from room temperature to a tempering temperature of between about 250° C. and about 700° C., preferably about 200° C. to about 500° C. and, immediately after reaching this temperature, is cooled to room temperature.

More particularly, in the method according to the invention, the martensitically hardened blank is brought, within a given heating time, to a peak tempering temperature which is up to about 100° K. over the normal holding time tempering temperature of the type of steel concerned. Thereby, the average heating rate amounts to at least 0.2° and up to about 2.5° K./s. Immediately after reaching this peak tempering temperature, the blanks are cooled. Hence, there is no holding time for a certain temperature normally specified for tempering the hardness structure. Accordingly, a tempering heat treatment which can be carried out in a relatively short time is obtained. In this connection, heating of the blank may be effected in a roller hearth furnace in a mechanically linked operation line, so that individual blanks travel successively through the heating furnace, are subsequently cooled and then can be fed to the machining apparatuses of a production line.

After cooling, each blank has a hardness structure whose hardness is directly proportional to the duration of heating time (i.e. feed-through conveying time) in the furnace. Thereby the blanks can assume a relatively high peak of tempering temperature. Otherwise, proper tempering is a function of the thickness of the blank absorbing the flow of heat, wherein the greater the thickness, the longer the heating time that is required.

The method according to the invention can be applied especially economically to the production of roller bearing elements of a hypereutectoid steel.

In one embodiment, the blank is continuously cooled in air at room temperature so that the blank stays within a region of high temperatures, i.e. over 200° C., for a relatively long time, including during first part of cooling cycle (shortly after the temperature peak), and is thus additionally tempered in this part of time. After complete cooling, each blank has a particular hardness structure adapted to the present application of the machine element which may, for example, have an especially low content of residual austenite.

It has been determined that by keeping the rate of temperature variation in heating of the blank at 3° K./s or less, the blank always absorbs a relatively small quantity of heat per unit of time during heating. This prevents harmful internal stresses in the blank, which are produced by uneven thermal expansion and structural transformation inside the blank and may lead to microscopic fractures in the hardness structure.

When the rate of temperature variation in cooling of the blank does not exceed 6° K./s, even on cooling of the blank, harmful internal stresses are not formed in the blank. The heating of the blank to tempering temperature may be carried out in a gas whose temperature is up to 150° K. in excess of the tempering peak temperature. This shows that heating of the blank may be affected by an essentially convective transfer of heat of a gas-heated furnace. In this connection, the blank may travel through the furnace at a given speed. Air, protective gas, reaction gas and, in some cases, even combustible gas may be considered as possible types of gases useful in the process of convectional heat transfer.

The gas or gases used for controlling the rate of heating of the blank to tempering temperatures is moved about the blank for a short period of time. As a result, the rate of temperature rise of the blank, for example, shortly before reaching the desired peak temperature, may be increased by a blower which moves the heated gas in the furnace thus increasing convectional heat transfer. In addition, non-contact infrared thermometers, which continously measure the temperature and rates of temperature rise of the blank or blanks and supply corresponding electric switching or control pulses to the motor driving the blower, may be incorporated in the furnace to control the effect of convectional heat transfer.

Heating of the blank to tempering temperatures can also be effected at least partly electroinductively, i.e. by the induction method with electrical inductors. The energy of inductive heating supplied may be adjusted to the desired rate of temperature variation.

Using inductors to control the rate of heating of the blank to tempering peak temperature, makes it possible to vary electric induction pulses thus regulating and adjusting the heating power of the inductor or inductors. At the same time, the rate of heating may be electronically detected and corrected with temperature thermometers which supply corresponding instantaneous control data.

DESCRIPTION OF THE DRAWINGS

The method according to the invention for producing machine elements of steel is explained in detail in the following description with the aid of the drawings, wherein.

DESCRIPTION OF THE PREFERRED EMBODIMENT

The method according to the invention produces martensitically hardened machine elements, for example, bearing rings, starting from blanks of a steel having a carbon content in the range of 0.3 to 1.1%.

When through-hardening steels are used, for example, rolling bearing steel 100 Cr 6, the carbon content of 0.9 to 1.1% is uniformly present over the entire cross section of each blank. When case hardening steels are used, the blank is carburized, in a fashion known per se, before austenitizing, so that it acquires the carbon content required for hardening in its surface layer.

The method according to the invention comprises the following procedural steps:

a) one (or more) blanks is heated to austenitizing temperature and austenitizing of the blank occurs at this temperature;

b) the blank is quenched from austenitizing temperature to about room temperature, so that a martensitic structure is produced in the blank with a hardness which is at least as great as the desired harness of the blank after cooling. Quenching may be effected in oil, salt, polymer solution or water;

c) the blank is steadily heated from room temperature to a tempering peak temperature of 250° to 700° C. in a furnace with a relative heating period (t/d)=50 to 210, where t=heating time in seconds, and d=thickness of the blank in mm;

d) the blank is continuously cooled immediately after reaching this tempering temperature, down to room temperature, so that the hardness structure of the blank temperature variation should be adjusted so that it does not exceed the value of 6° K./s.

e) finally the blanks are subjected to finish-machining, e.g. finish-grinding, of the blanks to machine elements.

Heating of the blank to tempering temperature may be effected in a furnace gas whose temperature is up to 150° K. over the tempering peak temperature. At the same time, to control the rate of heating of the blank in travel through the furnace, the gas may be moved along the blank for at least a short time so that, as a result of forced convection, a greater quantity of heat per unit of time is emitted by the gas to the blank.

Heating of the blank may alternatively be carried out, at least in part, by means of an induction process using electric inductors, known per se. At least one of the inductors may then work by the pulse method. To control the rate of heating to tempering peak temperature, the time intervals, course and/or duration of the electric pulses of the inductor may be varied electronically.

Figure 1:
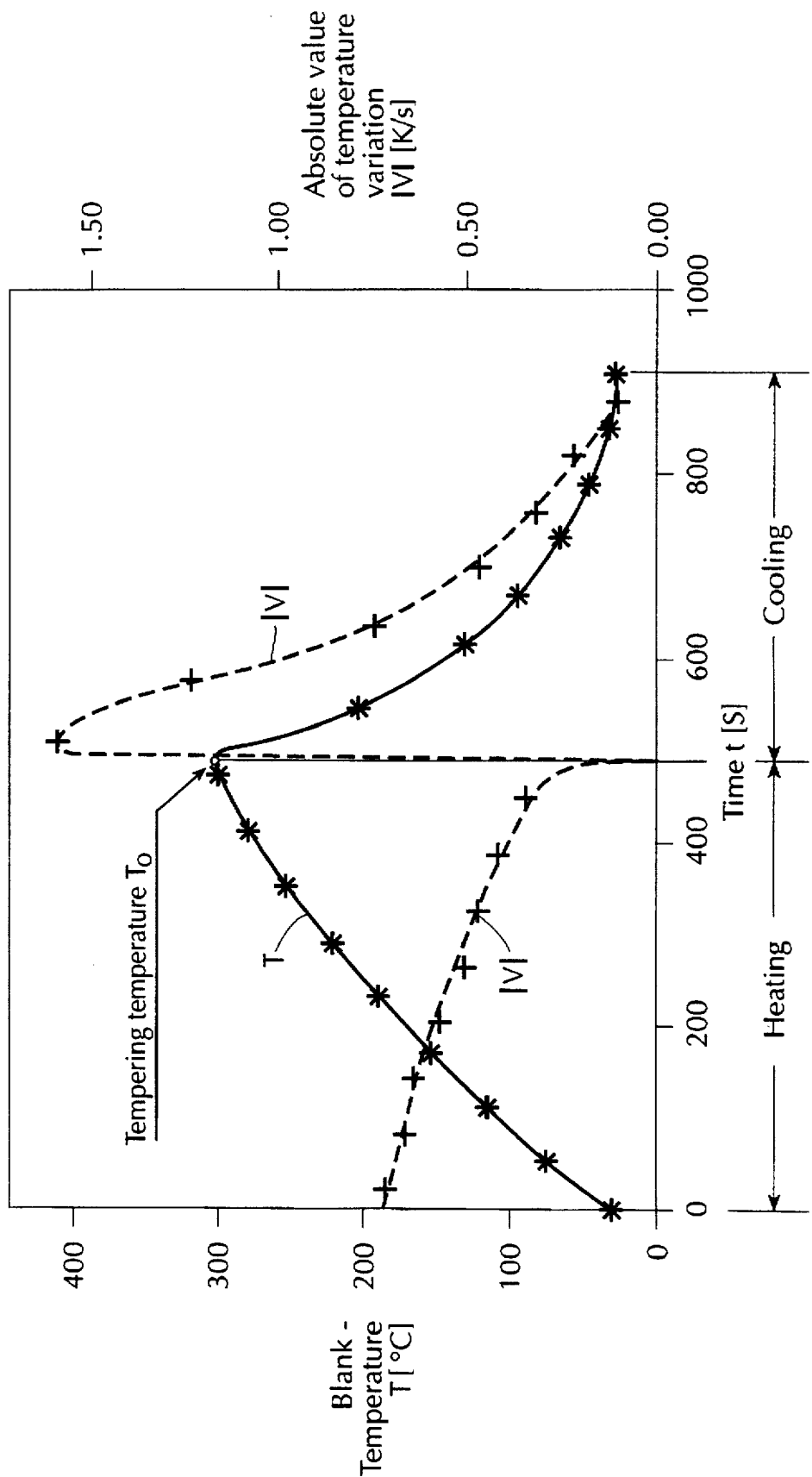
FIG. 1 is a diagram that indicates the course of the temperature of the blank and of the absolute value of temperature variation during heating and during subsequent cooling of the blank.

Using the procedural steps described above the method of the present invention was utilized to prepare a finished product. FIG. 1 depicts the example measured course of the temperature T of plurality of annular blanks upon travel through a roller hearth furnace with essentially convective heating of the blanks to a tempering peak temperature $T_o$ of about 300° C., and the course of the temperature T on subsequent cooling in ambient air at rest as a function of time.

The temperature of the air at rest in the furnace was about 500° C. The thickness of the blanks of hypereutectoid roller bearing steel 100 Cr 6 having a carbon content of about 1% amounted to 4 mm. Before heating, the martensitically hardened blanks had a hardness of 64 RHC, and after cooling a hardness of 60 RHC. After cooling, the content of residual austenite in the hardness structure was less than 3%.

In addition, it can be seen in the diagram in FIG. 1 that the maximum rate of temperature variation v (increase of temperature) occurs at the start of heating. It amounts to about 0.7° K./s. At the end of heating, i.e., when the maximum tempering temperature is reached, this rate declines to about 0. On cooling of the blanks in ambient air at rest, the rate of temperature variation (reduction of temperature) increases to a maximum of 1.6 K./s and then subsequently steadily decreases.

Figure 2:
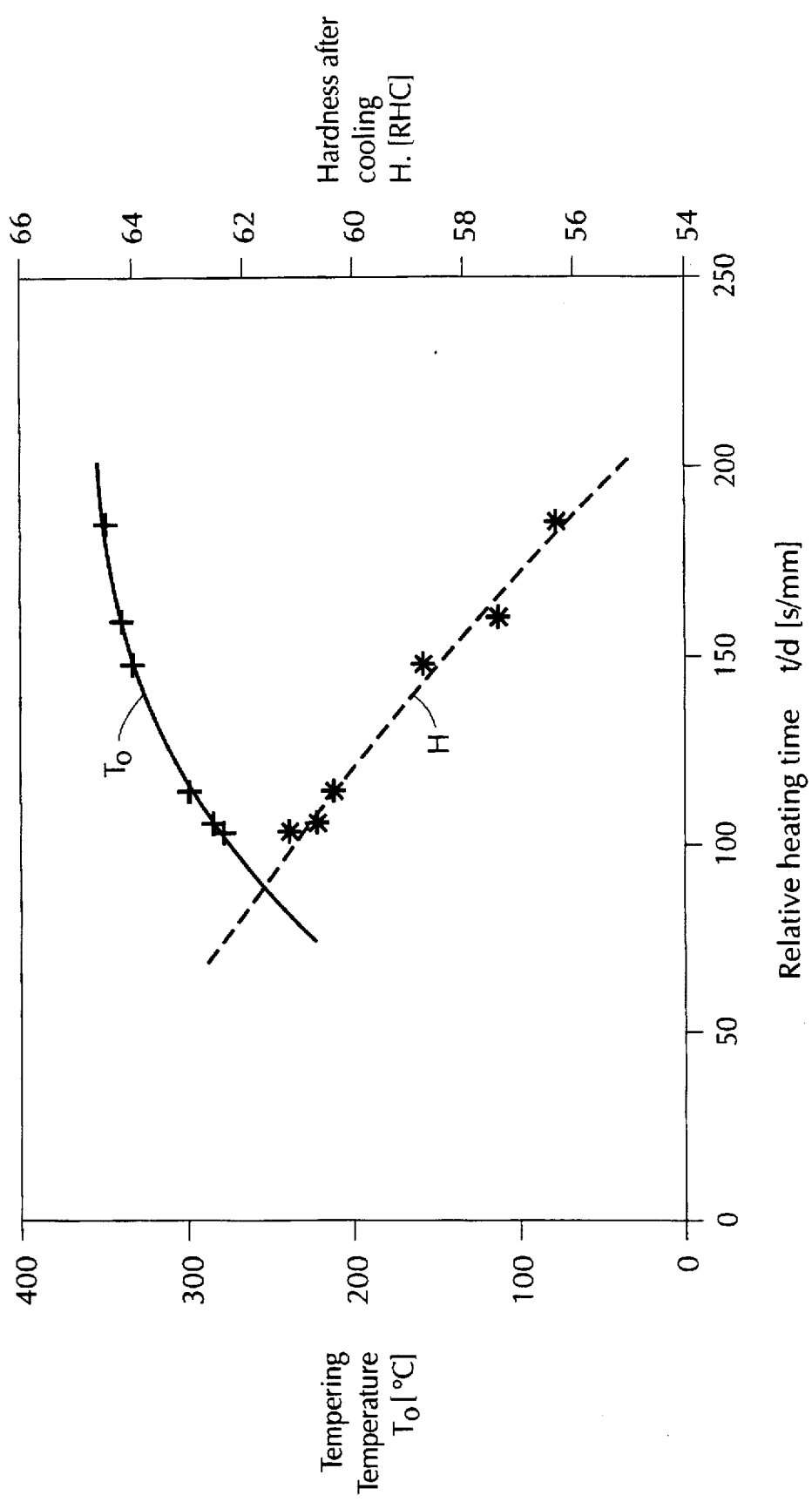
FIG. 2 is a diagram that indicates the dependence of the tempering temperature (peak temperature $T^o$) on the relative heating time in a gas-heated through-feed furnace and on the magnitude of the corresponding hardness of the blank after cooling.

FIG. 2 presents a diagram which shows the dependence of the hardness H of a variety of blanks after cooling as a function of the tempering temperature $T_o$ (250° to 360° C.) and the relative heating time t/d of the blanks. According to this, a hardness H in the region of 55 to 65 RHC. is attainable within a range of (t/d)=50 to 210 s/mm for blanks which have thicknesses d in the range of about 2 to 10 mm. The composition of the alloy steel 100 Cr 6, in percent by weight, is as follows:

|  | C | Si | Mn | Cr | P(Max) | S(Max) | Ni(Max) | Cu(Max) | Fe |
|---|---|---|---|---|---|---|---|---|---|
| 100Cr6 | 0.90–1.05 | 0.15–0.35 | 0.25–0.45 | 1.35–1.65 | 0.03 | 0.025 | 0.3 | 0.3 | Bal. | reaches the desired harness in the region of 45 to 65 RHC. Cooling of the blank is best effected, after the blank leaves the furnace, in ambient air at rest, for example, in the course of travel of the blank from a feed-through furnace to the subsequent machining station. At the same time, the rate of Similar results have been obtained with blanks that were produced from a hypoeutectoid tempering steel having a carbon content of 0.3 to 0.8%. After quenching, the blanks were steadily heated from room temperature to a tempering temperature of up to at most 700° C. and, immediately after reaching this peak temperature, were cooled to room temperature in ambient air, so that they attained a hardness of 45 to 62 RHC. There, heating of the blanks was in turn effected with a relative heating period t/d=50 to 210 s/mm. Thickness d of the blanks was 3 to 8 mm.

Having thus described our invention, what we claim and desire to protect by Letters Patent is:

1. A method for producing rolling bearing rings of martensitically hardened rings of rolling bearing steel 100 Cr 6 comprising:
   (a) heating said rings from room temperature to a tempering peak temperature exceeding up to about 100° K. the tempering temperature of about 230° C. conventionally used for said 100 Cr 6 steel, each said ring being steadily upheated in said heating step during a time satisfying the ratio (t/d) of between about 50 and 210, wherein t is the heating time in seconds and d is the wall thickness of the rings in millimeters, and then,
   (b) cooling the rings immediately after reaching said peak temperature to room temperature to attain a hardness of 45 to 65 HRC in said rings.

2. The method according to claim 1, wherein said step of cooling comprises continuously cooling said rings in air at rest at room temperature.

3. The method according to claim 2, wherein the rate of temperature rise during heating of the rings does not exceed 3° K./s.

4. The method of claim 3, wherein the rate of temperature drop during cooling of the rings does not exceed 6° K./s.

5. The method of claim 4, wherein the heating of the blank to tempering temperature is carried out in a gas whose temperature is up to 150° K. over the tempering temperature.

6. The method of claim 5, wherein the gas for controlling the rate of heating of the blank to tempering temperature is moved along the rings for at least a short period of time.

7. The method of claim 6, wherein the heating of the rings to tempering temperature is carried out at least partly by the induction method with electrical inductors.

8. The method of claim 7, wherein at least of one of the inductors for controlling the rate of heating of the rings to tempering temperature works by the pulse method, the time intervals and duration of the electrical pulses being varied.

* * * * *